(12) United States Patent
Li et al.

(10) Patent No.: US 11,502,565 B2
(45) Date of Patent: Nov. 15, 2022

(54) ROTOR, MOTOR, REINFORCEMENT RING TOOL AND MOUNTING METHOD THEREFOR

(71) Applicant: BEIJING GOLDWIND SCIENCE & CREATION WINDPOWER EQUIPMENT CO., LTD., Beijing (CN)

(72) Inventors: Yanhui Li, Beijing (CN); Dong Wang, Beijing (CN); Jingchao Yang, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 522 days.

(21) Appl. No.: 16/630,849

(22) PCT Filed: Jan. 18, 2019

(86) PCT No.: PCT/CN2019/072309
§ 371 (c)(1),
(2) Date: Jan. 13, 2020

(87) PCT Pub. No.: WO2019/144844
PCT Pub. Date: Aug. 1, 2019

(65) Prior Publication Data
US 2020/0144881 A1    May 7, 2020

(30) Foreign Application Priority Data
Jan. 26, 2018    (CN) .......................... 201810079503.0

(51) Int. Cl.
*H02K 1/28*    (2006.01)
*H02K 1/24*    (2006.01)
*H02K 15/02*   (2006.01)

(52) U.S. Cl.
CPC .................. *H02K 1/28* (2013.01); *H02K 1/24* (2013.01); *H02K 15/02* (2013.01)

(58) Field of Classification Search
CPC ............ H02K 1/24; H02K 1/28; H02K 15/02; H02K 1/22
(Continued)

(56) References Cited

U.S. PATENT DOCUMENTS

| 4,970,424 A | 11/1990 | Nakamura et al. |
| 2009/0087127 A1 | 4/2009 | Larsen et al. |

(Continued)

FOREIGN PATENT DOCUMENTS

| CN | 101403367 A | 4/2009 |
| CN | 202309459 U | 7/2012 |

(Continued)

OTHER PUBLICATIONS

International Search Report and Written Opinion in corresponding PCT Application No. PCT/CN2019/072309, dated Mar. 27, 2019, 11 pages.

(Continued)

*Primary Examiner* — Terrance L Kenerly
(74) *Attorney, Agent, or Firm* — Bayes PLLC

(57) ABSTRACT

A rotor, a motor, a reinforcement ring tool and a mounting method therefor are disclosed. A reinforcement ring tool may be mounted on the outer circumference of a rotor of a motor, the reinforcement ring tool comprising two or more separate components and two or more connecting members. The two or more connecting members correspond to the two or more separate components, and the two or more separate components are connected to each other by means of the two or more connecting members so as to form an annular body. At least two of the two or more connecting members are movable connecting members, and corresponding separate (Continued)

components are movably coupled to each other by means of the movable connecting members such that the reinforcement ring tool may be detachably engaged at the outer circumference of the rotor.

20 Claims, 11 Drawing Sheets

(58) Field of Classification Search
USPC .......................................... 29/732; 310/261.1
See application file for complete search history.

(56) References Cited

U.S. PATENT DOCUMENTS

| | | |
|---|---|---|
| 2010/0101080 A1 | 4/2010 | Tapper |
| 2012/0227536 A1 | 9/2012 | Jewett et al. |

FOREIGN PATENT DOCUMENTS

| | | |
|---|---|---|
| CN | 108336839 A | 7/2018 |
| CN | 208142948 U | 11/2018 |

OTHER PUBLICATIONS

Extended European Search Report and Written Opinion in corresponding European Application No. EP 19 74 4171, dated Jul. 1, 2020, 8 pages.

ROTOR, MOTOR, REINFORCEMENT RING TOOL AND MOUNTING METHOD THEREFOR

The application is a National Phase entry of PCT Application No. PCT/CN2019/072309, filed on Jan. 18, 2019, which claims the priority to Chinese patent application No. 201810079503.0 titled "ROTOR, ELECTRIC MACHINERY, REINFORCEMENT RING TOOLING AND MOUNTING METHOD THEREFOR", filed with the China National Intellectual Property Administration on Jan. 26, 2018, both of which are incorporated herein by reference in their entireties.

FIELD

The present application relates to the technical field of electric machineries, and in particular to a rotor, an electric machinery, a reinforcement ring tooling and a method for mounting the reinforcement ring tooling.

BACKGROUND

At present, an electric machinery with low-speed and large-diameter has many advantages, and thus has been widely used. For example, in the field of wind turbines, a direct-drive wind turbine is widely used due to its advantages of high efficiency, low noise, high life, and low operation and maintenance costs. However, as the power of the wind turbine increases, the volume and the weight of the electric machinery in the direct-drive wind turbine also increase.

For example, a permanent magnet synchronous electric machinery is mainly composed of a stator and a rotor. Taking an electric machinery with the rotor mounted outside as an example, the stator is fixed at the center of the electric machinery, and the rotor is mounted around the outer circumference of the stator, so that the rotor can rotate around the central axis of the stator. However, since the rotor yoke is a thin-walled member and has a large diameter, the rotor is easily deformed during machining, transporting and mounting process of the electric machinery.

In order to solve the problem of the rotor deformation during machining, transportation and mounting process, at present, one of the conventional technology methods is to use a permanent reinforcement ring welded on the outer wall of the rotor yoke, which not only causes the outer dimension of the electric machinery to increase but also causes the material cost of the electric machinery to increase. Another method is to use a temporary reinforcement ring welded on the outer wall of the rotor yoke. Although the material cost of the electric machinery is not increased, the rotor is required to be cut, polished, and preserved, so that the processing cost is high.

Therefore, there is a requirement for a rotor, an electric machinery, a reinforcement ring tooling and a method for mounting the reinforcement ring tooling.

SUMMARY

According to an embodiment of the present application, a rotor, an electric machinery, a reinforcement ring tooling, and a method for mounting the reinforcement ring tooling are provided, which can achieve one or more purposes among avoiding deformation of a rotor during transporting and mounting an electric machinery, reducing a manufacturing cost of the electric machinery, and reducing the operational difficulty of transporting and mounting the electric machinery.

According to an aspect of an embodiment of the present application, a reinforcement ring tooling is provided, which is configured to mount on an outer circumference of a rotor of an electric machinery. The reinforcement ring tooling includes more than two separate members and more than two connection member, and the more than two connection members are in correspondence with the more than two separate members, and the more than two separate members are connected to each other to form an annular body through the more than two connection members, where at least two of the more than two connection members are movable connection members, and the corresponding separate members are movably connected to each other by the movable connection members, so that the reinforcement ring tooling is detachably mounted at the outer circumference of the rotor.

Since the reinforcement ring tooling is detachably attached to the rotor, the reinforcement ring tooling has strong flexibility, that is, the reinforcement ring tooling can be selectively mounted to the outer circumference of the rotor according to requirement of the operation process. Therefore, while the structural strength of the rotor is improved and deformation of the rotor is prevented, the manufacturing cost of the electric machinery can be reduced, and the assembly efficiency of the electric machinery can be improved.

According to another aspect of an embodiment of the present application, a rotor is further provided, which includes a yoke and a magnetic pole provided on an inner circumference of the yoke. The rotor further includes the above reinforcement ring tooling, which is mounted on an outer circumference of the yoke. By the reinforcement ring tooling, the structural strength of the rotor can be improved, the rotor can be prevented from being deformed, and the reinforcement ring tooling can be selectively mounted or removed on the outer circumference of the rotor according to actual requirements, thereby the cost of the rotor is reduced and the radial space occupied by the rotor is reduced in a process that does not require an increase in the strength of the rotor structure.

According to yet another aspect of an embodiment of the present application, an electric machinery is also provided, which include the above rotor. By the reinforcement ring tooling, the structural strength of the rotor can be improved, the rotor can be prevented from being deformed, and the reinforcement ring tooling can be selectively mounted or removed on the outer circumference of the rotor according to actual requirements, thereby the cost of the rotor is reduced and the radial space occupied by the rotor is reduced in a process that does not require an increase in the strength of the rotor structure.

According to yet another aspect of an embodiment of the present application, a method for mounting the reinforcement ring tooling is further provided, which includes:

a step of providing separate members: providing more than two separate members and more than two connection members corresponding to the more than two separate members; a step of connecting the separate members: connecting the more than two separate members to each other by the more than two connection members to form an annular body, and at least two of the more than two connection members are configured as movable connection members, so that the corresponding separate members are movably connected to each other by the movable connection members; and a step of engaging the annular body with the rotor: mounting the annular body to the outer circumference of the rotor.

Since the reinforcement ring tooling is detachably engaged with the rotor, the reinforcement ring tooling has strong flexibility, that is, the reinforcement ring tooling can be selectively mounted to the outer circumference of the rotor according to requirement of the operation process. Therefore, while the structural strength of the rotor is improved and deformation of the rotor is prevented, the manufacturing cost of the electric machinery can be reduced, and the assembly efficiency of the electric machinery can be improved.

BRIEF DESCRIPTION OF THE DRAWINGS

The present application can be better understood from the following description of the specific embodiments of the present application, in which.

Other features, objects, and advantages of the present application will become more apparent from reading the following detailed description of the non-limiting embodiments provided in the drawings. The same or similar reference numerals denote the same or similar features.

Figure 1:
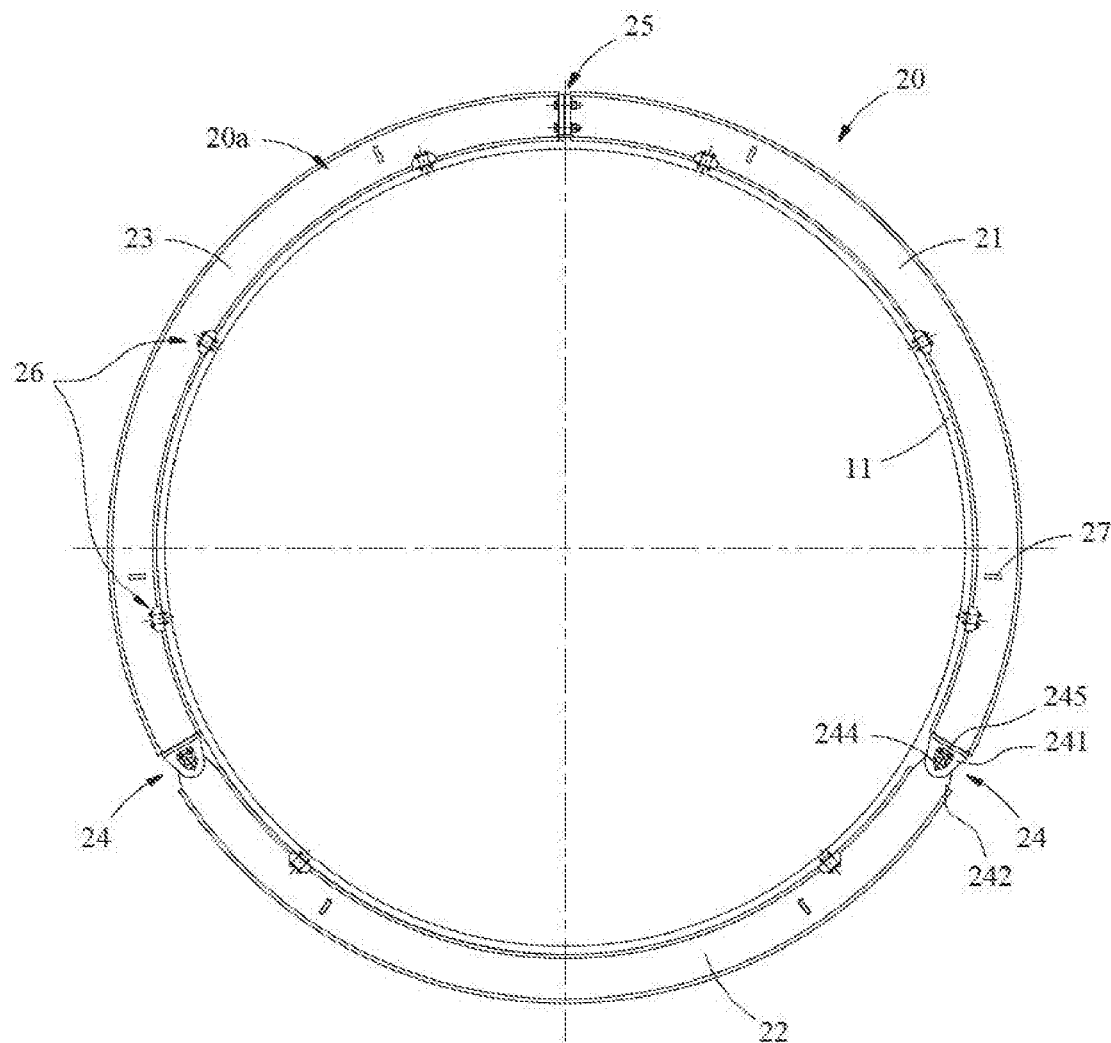
FIG. 1 is a schematic view showing the structure of a reinforcement ring tooling in a using state according to an embodiment of the present application.

| Reference Numerals: | |
|---|---|
| 10 rotor, | 11 yoke, |
| 12 rotor end cover, | 13 oblique support, |
| 20 reinforcement ring tooling, | 20a annular body; |
| 21 separate member, | 211 first curved plate body, |
| 212 second curved plate body, | 213 ring body, |
| 214 ring body, | 215 fixing plate, |
| 22 separate member, | 221 first curved plate body, |
| 222 second curved plate bod, | 223 ring body, |
| 224 ring body, | 23 separate member, |
| 24 adjusting member, | 241 convex lug, |
| 241a upper lug plate, | 241b lower lug plate |
| 241c pin hole, | 242 convex lug, |
| 242a upper lug plate, | 242b lower lug plate |
| 242c pin hole, | 243 retaining sleeve |
| 244 pin shaft, | 245 stopper, |
| 246 bolt, | 25 distance adjusting member, |
| 251 connection end plate, | 251a inserting slot, |
| 25 lb through hole, | 252 connection end plate |
| 253 first fastener, | 254 retaining block, |
| 254a holding opening, | 26 limiting member |
| 261 stopper, | 262 third fastener, |
| 27 lifting lug. | |

DETAILED DESCRIPTION

Features from various aspects and exemplary embodiments according to the present application are described in detail below. In the following detailed description, numerous specific details are described to provide a thorough understanding of the application. However, it will be apparent to those skilled in the art that the present disclosure may be practiced without some of the details. The following description of the embodiments is merely provided to provide a better understanding of the present application. In the drawings and the following description, at least some of the structures and techniques are not shown in order to avoid unnecessary obscuring of the present application; and, for clarity, the dimensions of some of the structures may be exaggerated. The same reference numerals in the drawings denote the same or similar structures, and thus their detailed description will be omitted. Furthermore, the features, structures, or characteristics described hereinafter may be combined in any suitable manner in one or more embodiments.

The orientation words appearing in the following description are all directions shown in the drawings, which are not intended to limit the specific structure of the reinforcement ring tooling according to the present application. In the description of the present application, it should also be noted that the terms "mounting", "connecting", and "connected" are to be understood broadly, maybe, for example, a fixed connection, a detachable connection, or an integral connection; they can be connected directly or indirectly. For those of ordinary skill in the art, the specific meanings of the above terms in the present application can be understood according to the specific case.

The reinforcement ring tooling according to the embodiment of the present application can be conveniently mounted on the outer circumference of the rotor of the electric machinery. It should be noted that the rotor in the embodiment of the present application is an outer rotor, that is, the rotor is mounted outside the stator of the electric machinery. Through the relative rotation between the stator and the rotor, the rotor cuts the magnetic lines of force, thereby a current is generated in the winding and the current can be output outward. The reinforcement ring tooling according to the embodiment of the present application can improve the rigidity of the rotor and avoid deformation of the rotor in the circumferential direction, and the deformation may affect the subsequent mounting operation of the rotor and the stator, or affect the structure of the electric machinery itself, causing problems such as uneven radial gap in the electric machinery. In addition, when the electric machinery is used after assembly, the reinforcement ring tooling can be easily removed from the outer circumference of the rotor, so that it has strong flexibility and it is easily operated.

For a better understanding of the present application, a reinforcement ring tooling according to an embodiment of the present application will be described in detail below in conjunction with FIGS. 1 to 16.

Figure 2:
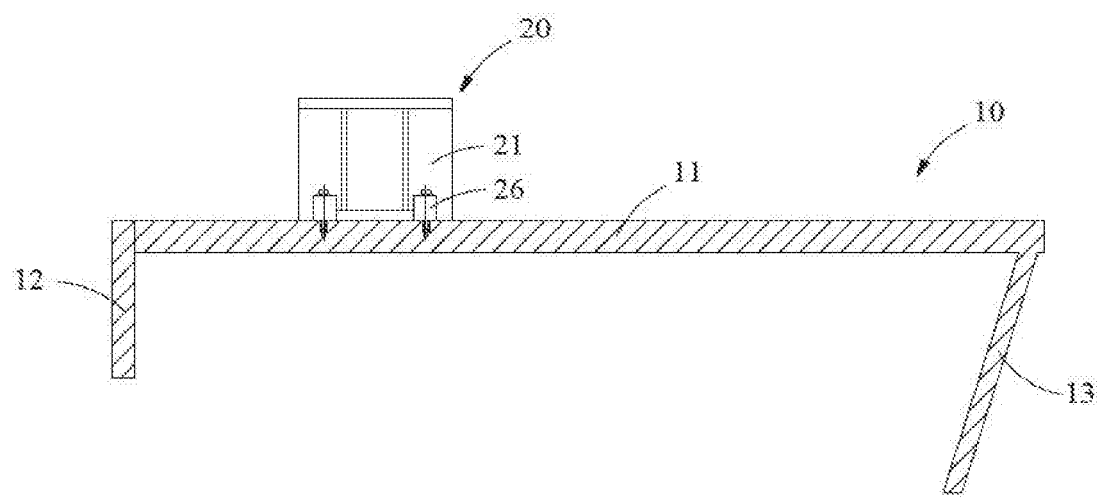
FIG. 2 is a cross-sectional view showing a portion of the structure of the reinforcement ring tooling in the using state in FIG. 1.

FIG. 1 is a schematic view showing the structure of a reinforcement ring tooling 20 in a using state according to an embodiment of the present application; and FIG. 2 is a cross-sectional view showing a portion of the structure of the reinforcement ring tooling 20 in the using state in FIG. 1. In order to facilitate the clarity of the structure, in FIG. 2, only a part of the structure of the rotor 10 and the reinforcement ring tooling 20 is shown. It can be understood that the rotor 10 as a whole has an annular shape. As shown in FIGS. 1 and 2, according to an exemplary embodiment of the present application, the rotor 10 includes a yoke 11, a rotor end cover 12 and an oblique support 13, all of which have an annular shape, and the rotor end cover 12 and the oblique support 13 are respectively provided at two ends of the yoke 11 in an axial direction and extend radially toward an inside of the rotor 10, in which the oblique support 13 is configured to connect to the rotating shaft of the rotor 10.

According to an embodiment of the present application, the reinforcement ring tooling 20 includes more than two separate members and more than two connection members, and the more than two connection members are in correspondence with the more than two separate members, and the more than two separate members are connected to each other to form an annular body 20a through the more than two connection members, and at least two of the more than two connection members are movable connection members, and the corresponding separate members are movably connected to each other by the movable connection members, so that the reinforcement ring tooling 20 is detachably engaged at the outer circumference of the rotor 10.

Thus, the reinforcement ring tooling 20 according to the embodiment of the present application is engaged with the rotor 10 in a detachable manner to improve the structural strength of the rotor 10. By the flexible disassembly operation of the reinforcement ring tooling 20, the reinforcement ring tooling 20 can be selectively mounted to the outer circumference of the rotor 10 in a special operation step as required, thereby reducing the cost of the electric machinery and simplifying the operations of the electric machinery.

Figure 3:
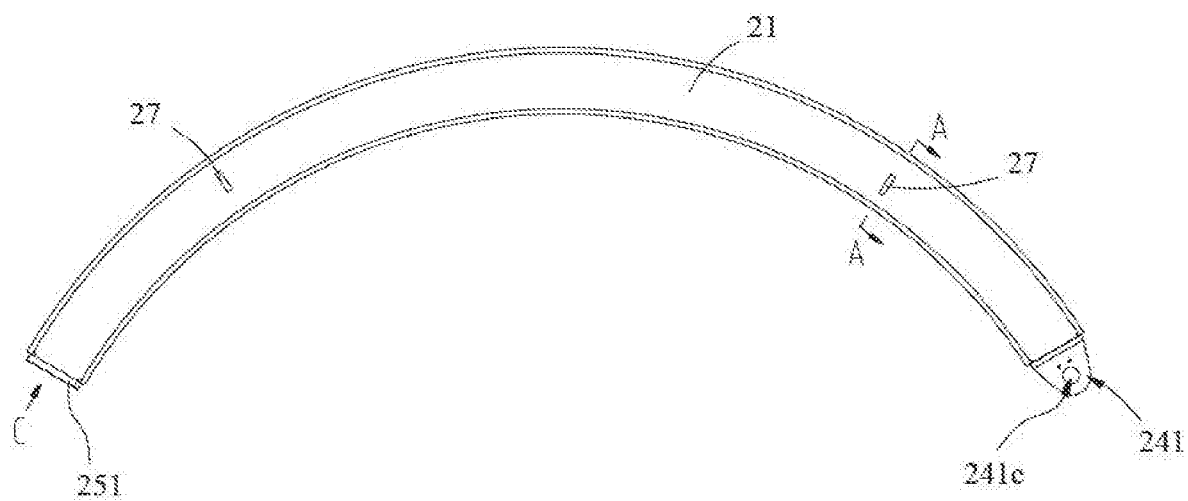
FIG. 3 is a schematic view showing the structure of a separate member of the reinforcement ring tooling in FIG. 1.
Figure 4:
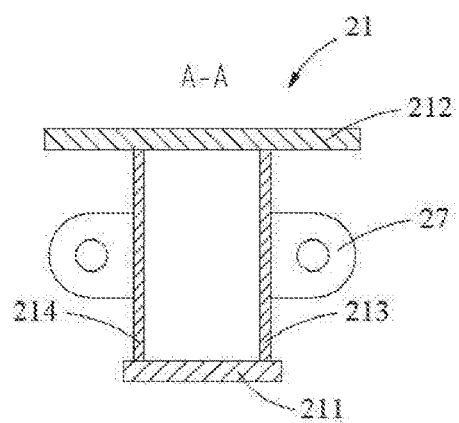
FIG. 4 is a cross-sectional view showing the structure of the separate member taken along line A-A in FIG. 3.

FIG. 3 is a schematic view showing the structure of a separate member 21 of the reinforcement ring tooling 20 in FIG. 1; and FIG. 4 is a cross-sectional view showing the structure of the separate member 21 taken along line A-A in FIG. 3. As shown in FIGS. 1 to 4, according to a specific example of the present application, the reinforcement ring tooling 20 includes three separate members and three connection members, that is, the reinforcement ring tooling 20 includes the separate member 21, the separate member 22, and the separate member 23. The separate member 21, the separate member 22, and the separate member 23 are connected end to end by three connection members to constitute the annular body 20a.

In addition, according to an alternative embodiment of the present application, in order to reduce the weight of the reinforcement ring tooling 20 itself and ensure that the reinforcement ring tooling 20 does not impose too much weight on the rotor 10 when being mounted to the rotor 10, the bodies of the separate member 21, the separate member 22, and the separate member 23 all employ box beam structures, that is, the separate member 21, the separate member 22, and the separate member 23 are all bodies of hollow structures.

Since the main bodies of the separate member 21, the separate member 22, and the separate member 23 have the same structures, only the separate member 21 will be described as an example. The body of the separate member 21 includes a first curved plate body 211 and a second curved plate body 212, and the second curved plate body 212 is located radially outside the first curved plate body 211 (in accordance with the reference direction of the entire annular body 20a), and a supporting member supported between the first curved plate body 211 and the second curved plate body 212 to retain a predetermined distance between the first curved plate body 211 and the second curved plate body 212 by the supporting member. For example, in the embodiment, the support member may include a ring body 213 and a ring body 214, and the ring body 213 and the ring body 214 are all plate-shaped and are supported in a circumferential direction between the first curved plate body 211 and the second curved plate body 212 in parallel and spaced apart from each other. The predetermined distance may be selected according to actual conditions, for example, it may be selected according to the actual diameter size of the rotor 10 to prevent deformation of the rotor 10 while avoiding excessive radial space occupied by the reinforcement ring tooling 20. In addition, the embodiment of the present application is not limited to the connection method between the first curved plate body 211, the second curved plate body 212, the ring body 213 and the ring body 214, for example, the connection to each other can be achieved by welding or bolting.

Therefore, after the three separate members are connected to each other, an accommodation space is enclosed by the respective first curved plate bodies 211 located on an radial inner side so as to receive the rotor 10 through the accommodation space. When the annular body 20a is mounted on the outer circumference of the rotor 10, the separate member 21, the separate member 22, and the separate member 23 are respectively contact with the yoke 11 of the rotor 10 through the respective first curved plates, that is, the outer circumferential surface of the rotor 10 and the inner circumferential surface of the annular body 20a are attached to each other. Since the first curved plate 211 and the second curved plate 212 are stably retained in a separated state by the two supporting plates, the annular body 20a composed of the separate member 21, the separate member 22, and the separate member 23 can provide a strong retaining force for the rotor 10 in the radial direction, so that the rotor 10 can be effectively prevented from being deformed.

Of course, in other modified embodiments, the separate member 21, the separate member 22, and the separate member 23 may also be of an I-beam structure, that is, in the present embodiment, one of the ring body 213 and the ring body 214 may be removed on the basis of the above separate member 21 in FIG. 4, so that only one ring body 214 is left between the first curved plate body 211 and the second curved plate body 212, at this time, the predetermined distance is retained between the first curved plate body 211 and the second curved plate body 212 by the ring body 214. In addition, in other modified embodiments, the supporting member between the first curved plate body 211 and the second curved plate body 212 may be replaced by an annular bracket or a block structure; of course, the supporting member may be enclosed in a continuous annular shape or may be enclosed in an intermittent annular shape as long as it can provide a retaining force to the rotor 10 in the circumferential direction. In addition, in the above embodiment, the separate member 21, the separate member 22, and the separate member 23 are all substantially arc-shaped members, but the embodiment of the present application is not limited thereto, and in other modified embodiments, the contours of the outer circumferential surfaces of the separate member 21, the separate member 22, and the separate member 23 may not be curved, that is, the outer contour of the annular body 20a formed by the above three connections may not be circular, for example, the outer contour of the annular body 20a may also be square.

According to an embodiment of the present application, in order to facilitate the subsequent lifting operation of the reinforcement ring tooling 20, each of the separate members of the reinforcement ring tooling 20 is further provided with a lifting lug 27, the lifting lug 27 has a lifting hole, which can be welded to the respective separate members. In this way, the lifting mechanism can lift the annular body 20a composed of the separate member 21, the separate member 22, and the separate member 23 through the lifting lug 27.

According to an embodiment of the present application, the three connection members of the reinforcement ring tooling 20 are all movable connection members, that is, the separate member 21, the separate member 22 and the separate member 23 are connected to each other by a movable connection. For example, the movable connection member may be a rotation adjusting member 24 or a distance adjusting member 25, that is, the two separate members may be rotatably connected to each other by the rotation adjustment member 24; or the two separate members may be connected to each other close to each other or away from each other by the distance adjusting member 25.

Of course, the lengths of the three separate members of the reinforcement ring tooling 20 in the above embodiment may be the same or different, and the embodiment of the present application is not limited herein as long as the three separate members can be detachably mounted on the outer circumference of the rotor 10 and there is no mounting interference with the rotor 10 when the three separate members are mounted to the outer circumference of the rotor 10.

According to an embodiment of the present application, the separate member 21 and the separate member 22 are connected by the rotation adjusting member 24, and the separate member 22 and the separate member 23 are also connected by the rotation adjusting member 24, while the separate member 21 and the separate member 23 are connected by the distance adjusting member 25. Further, in the present embodiment, the separate member 21 and the separate member 23 have the same general structure, except that the separate member 21 and the separate member 23 are symmetrically arranged along the radial center plane of the reinforcement ring tooling 20. Since the connection method of the separate member 21 and the separate member 22 is the same as that of the separate member 23 and the separate member 22, only the connection between the separate member 21 and the separate member 22 will be described as an example.

Figure 5:
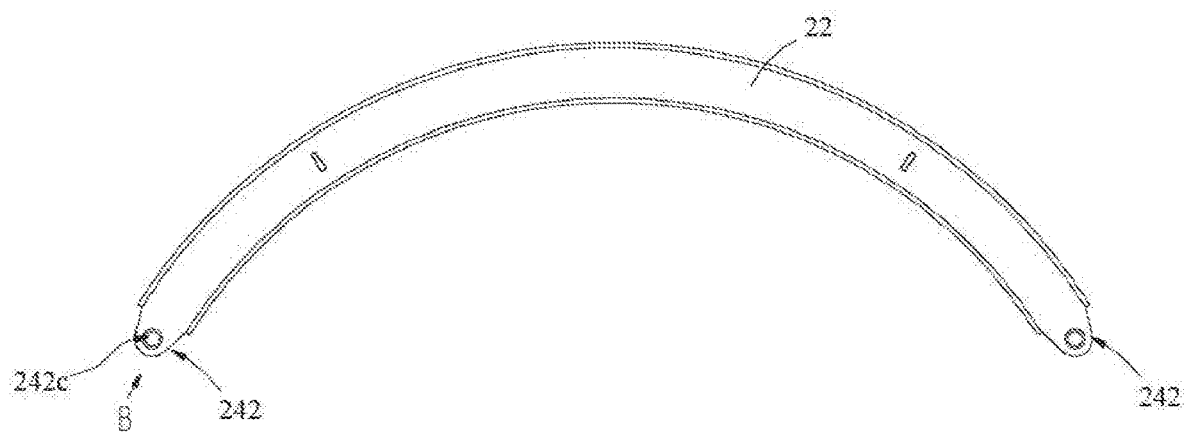
FIG. 5 is a schematic view showing the structure of another separate member of the reinforcement ring tooling in FIG. 1.
Figure 6:
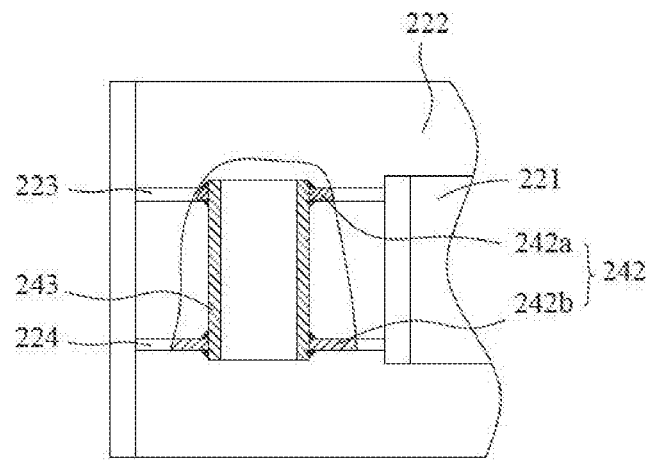
FIG. 6 is a partial cross-sectional view of the separate member in FIG. 5 as viewed in the B direction.
Figure 7:
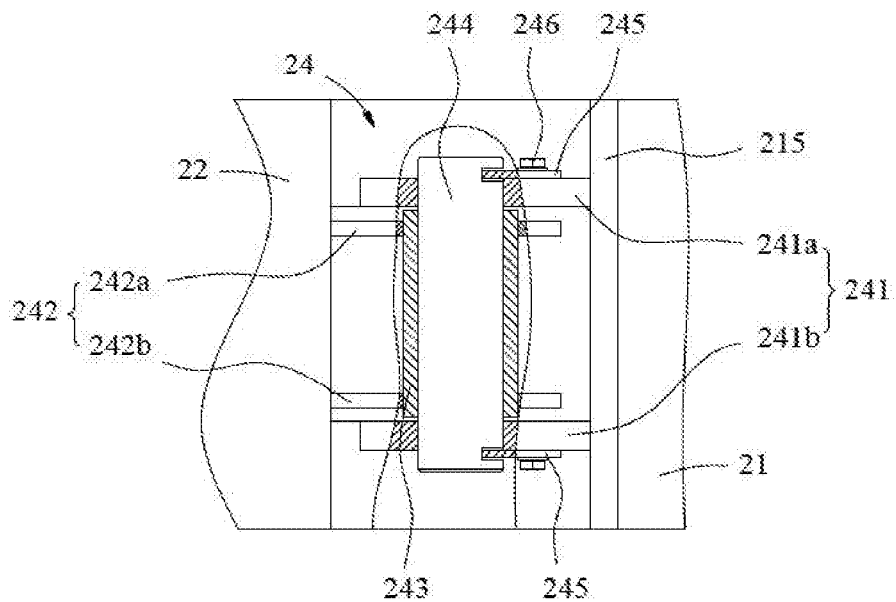
FIG. 7 is a partial cross-sectional view showing the structure of the connection portion of the two separate members in FIG. 1.

FIG. 5 is a schematic view showing the structure of another separate member 22 of the reinforcement ring tooling 20 in FIG. 1; FIG. 6 is a partial cross-sectional view of the separate member 22 in FIG. 5 as viewed in B direction; and FIG. 7 is a partial cross-sectional view showing the structure of the connection portion of the separate member 21 and the separate member 22 in FIG. 1. As shown in FIGS. 3 to 7, in an exemplary embodiment, the rotation adjusting member 24 includes: a convex lug 241, a convex lug 242, a retaining sleeve 243, a pin shaft 244, and pin holes that are correspondingly provided on the separate member 21 and the separate member 22 through which the pin shaft 244 can be inserted, so that the separate member 21 and the separate member 22 are rotatably connected by the pin shaft 244.

Similarly, the body of the separate member 22 includes a first curved plate body 221 and a second curved plate body 222 located radially outside (in accordance with the reference direction of the entire annular body 20a), and a supporting member supported between the first curved plate body 221 and the second curved plate body 222, that is, the ring body 223 and the ring body 224, to retain a predetermined distance between the first curved plate body 221 and the second curved plate body 222 by the ring body 223 and the ring body 224.

The convex lug 241 is provided on the separate member 21. For example, in order to mount the convex lug 241, a connection end of the separate member 21 is further provided with a fixing plate 215 which is mounted to the connection end of the separate member 21 in a manner perpendicular to the ring body 213 and the ring body 214 of the separate member 21. The convex lug 241 includes an upper lug plate 241a and a lower lug plate 241b. The upper lug plate 241a and the lower lug plate 241b are mounted on the fixing plate 215 in parallel with each other while extending away from the separating member 21 to form a receiving space between the upper lug plate 241a and the lower lug plate 241b. In order to cooperate with the pin shaft 244, the pin holes 241c are respectively formed in the upper lug plate 241a and the lower lug plate 241b.

The convex lug 242 is provided on the separate member 22. For example, the convex lug 242 includes an upper lug plate 242a and a lower lug plate 242b, and the upper lug plate 242a is formed by the ring body 223 of the separate member 22 extending away from the separate member 22, and the lower lug plate 242b is formed by the ring body 224 of the separate member 22 extending away from the separate member 22. Similarly, in order to cooperate with the pin shaft 244, the upper lug plate 242a and the lower lug plate 242b are respectively provided with pin holes 242c. Further, in the present embodiment, in order to more conveniently cooperate with the pin shaft 244, the retaining sleeve 243 is further provided in the pin hole 242c of the convex lug 242 to be in contact with the pin shaft 244 by the retaining sleeve 243.

When the separate member 21 and the separate member 22 are required to be connected, firstly, the convex lug 242 is inserted into the receiving space formed by the convex lug 241, so as to ensure that the hollow portion of the retaining sleeve 243 is simultaneously aligned with the pin holes 241c of the upper lug plate 241a and the lower lug plate 241b and the two axial end surfaces of the retaining sleeve 243 are respectively in top contact with the upper lug plate 241a and the lower lug plate 241b. At this time, the pin shaft 244 can be inserted into the retaining sleeve 243 from the pin holes 241c of the upper lug plate 241a or the lower lug plate 241b. Thereby, the separate member 21 and the separate member 22 can be connected to each other in a relatively rotatable manner. Therefore, the retaining sleeve 243 is provided, which is not only more conveniently to cooperate with the pin shaft 244, but also can provide the supporting force to the convex lug 241. In a connected state of the separate member 21 and the separate member 22, the deformation of the rotation adjusting member 24 which can cause a problem that the rotational connection failure occurs between the separate member 21 and the separate member 22 can be prevented, so that the reliability of the use of the reinforcement ring tooling 20 can be improved.

In addition, for the specific structure of the rotation adjusting member 24, the embodiment of the present application is not limited. Based on the above embodiments, it can be understood that, in other alternative embodiments, other structures may be used for making the separate member 21 and the separate member 22 be rotatably connected.

Referring specifically to FIG. 7, in order to prevent the pin shaft 244 from moving axially in the pin hole 241c of the convex lug 241 and the pin hole 242c of the convex lug 242, the rotation adjusting member 24 is further provided with a locking member for axially limiting the pin shaft 244 by the cooperation of the locking member and the pin shaft 244. According to an exemplary embodiment of the present application, the pin shaft 244 is limited by locking at both ends. Specifically, the locking member includes two stopping members 245, and correspondingly, the pin shaft 244 is provided with two clamping slots that can be engaged with the stopping member 245. For example, in the present embodiment, the stopping member 245 is a baffle.

When the pin shaft 244 is inserted into the pin holes (that is, the retaining sleeve 243) of the convex lug 241 and the convex lug 242, the two clamping slots of the pin shaft 244 are located outside the upper lug plate 241a and the lower lug plate 241b, respectively. The term "outside" herein denotes a side of the upper lug plate 241a or the lower lug plate 241b in which the upper lug plate 241a and the lower lug plate 241b face away from each other. The two baffles can be respectively inserted into the two clamping slots and respectively abut against the corresponding upper or lower lug plates 241a and 241b. Thus, the axial movement of the pin shaft 244 is limited by the cooperation of the two stopping members 245 at both ends, so as not to move in the pin holes of the lugs 241 and lugs 242. In addition, in order to prevent the baffle from coming out of the clamping slot of the pin shaft 244, the rotation adjusting member 24 further includes a bolt 246, and the upper lug plate 241a is correspondingly provided with a screw connection hole, thereby the baffle is fixed to the upper lug plate 241a by the cooperation of the screw connection holes with the bolt 246, thereby improving the connection reliability of the rotation adjusting member 24.

In addition, in the embodiment of the present application, the specific structure of the locking member is not limited. In other alternative embodiments, the locking member may also be a separate pin, a clamping member or other structure that can cooperate with the pin shaft 244 and the lug to achieve axially limiting of the pin shaft 244. Of course, the stopping member 245 can also be a cylindrical body. Moreover, in other modified embodiments, the pin shaft 244 can be axially limited by locking at one end. At this time, for example, the locking structure provided at one end of the axial direction of the pin shaft 244 itself can abut against and cooperate with the upper lug plate 241a, and the other end of the pin shaft 244 can be provided with a clamping slot, then, the pin shaft 244 can be limited from moving by the cooperation of the stopping member 245 in the above embodiment with the clamping slot and the lower lug plate 241b.

Further, in the above embodiment, the convex lug 241 is provided at the connection end of the separate member 21, and the convex lug 242 is provided at the connection end of the separate member 22, and the convex lug 241 and the convex lug 242 are rotatably connected by the pin shaft 244 to achieve a rotatable connection between the separate member 21 and the separate member 22. However, the embodiment of the present application is not limited thereto. In other modified embodiments, the rotation adjusting member 24 may also be configured as an integral member, that is, the convex lug 241 and the convex lug 242 are rotatably connected by the pin shaft 244. In this case, the separate member 21, the separate member 22, and the separate member 23 can be made into standard members, so that multiple separate members having the same size and structure can be produced in accordance with the standard size. When the multiple separate members are required to assemble into the annular body 20a, the convex lug 241 and the convex lug 242 in the rotation adjusting member 24 can be respectively connected to the connection end of the separate member 21 and the connection end of the separate member 22, thereby achieving a quick and rotatable connection of the separate member 21 and the separate member 22, and at the same time, simplifying the processing of the entire reinforcement ring tooling 20.

Figure 8:
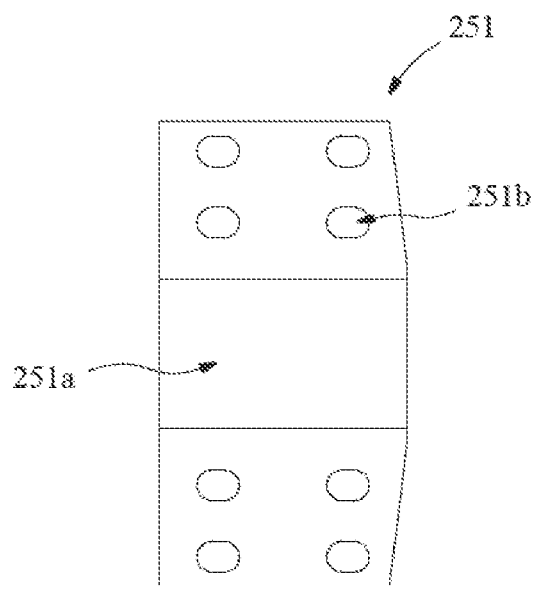
FIG. 8 is a partial cross-sectional view of the separate member in FIG. 3 as viewed in the C direction.
Figure 9:
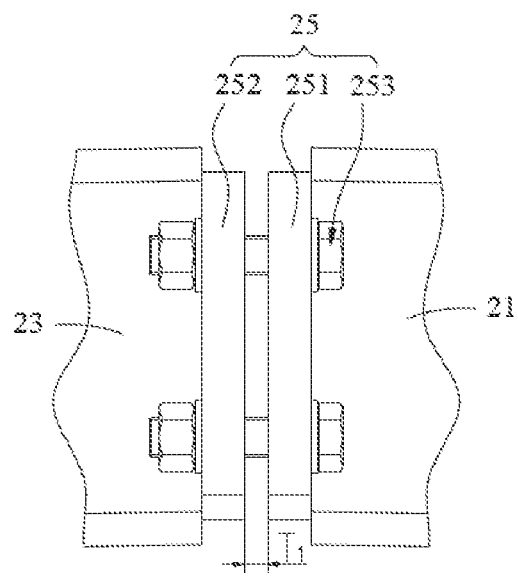
FIG. 9 is a schematic view of the connection portion of the two separate members in FIG. 1.
Figure 10:
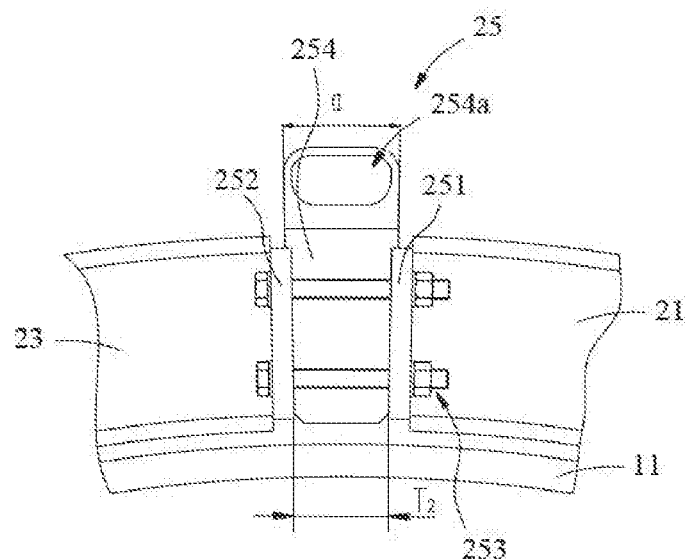
FIG. 10 is a schematic view of the connection portion of the two separate members of FIG. 9 in another state.

FIG. 8 is a partial cross-sectional view of the separate member 21 in FIG. 3 as viewed in the C direction; FIG. 9 is a schematic view of the connection portion of the separate member 21 and the separate member 23 in FIG. 1; and FIG. 10 is a schematic view of the connection portion of FIG. 9 in another state. As shown in FIGS. 1, 3, 8 and 10, according to a specific example of the present application, the distance adjusting member 25 includes: a connection end plate 251, a connection end plate 252 and an adjusting member. The connection end plate 251 is connected to the connection end of the separate member 21, and the connection end plate 252 is connected to the connection end of the separate member 23, and the adjusting member is respectively engaged with the connection end plate 251 and the connection end plate 252 to adjust the distance between the connection end plate 251 and the connection end plate 252.

Since the connection end plate 251 and the connection end plate 252 have the same structure and connection method, only the connection end plate 251 connected to the separate member 21 will be described as an example. The connection end plate 251 may be a plate body with a shape of a rectangle, a square and a circle. An inserting slot 251a is formed on one side of the connection end plate 251, and the inserting slot 251a is located at a substantially intermediate position of the connection end plate 251. Multiple through holes 251b are respectively provided on both sides of the inserting slot 251a. When the connection end plate 251 is mounted to the separate member 21, the side on which the connection end plate 251 is provided with the inserting slot 251a faces away from the separate member 21, and the multiple through holes 251b on both sides of the inserting slot 251a of the connection end plates 251 are respectively exposed beyond the outer sides of the ring body 213 and the ring body 214 of the separate member 21 to perform subsequent connection operations. That is, the connection end plate 251 and the connection end plate 252 are opposed to each other by the side faces each provided with the inserting slots, so that a mounting opening can be formed by the cooperation of the inserting slots 251a of the connection end plates 251 with the inserting slots of the connection end plates 252, and the mounting opening extends in the radial direction of the annular body 20a.

For example, in the present embodiment, the adjusting member includes a first fastener 253 and a retaining block 254 to secure the retaining block 254 between the connection end plate 251 and the connection end plate 252 by the first fastener 253; or the first fastener 253 is removed, and the retaining block 254 is removed from between the connection end plate 251 and the connection end plate 252, thereby achieving the purpose of changing the distance between the connection end plate 251 and the connection end plate 252 and ensuring the connection end plate 251 and the connection end plate 252 to be always firmly connected to each other.

Specifically, the retaining block 254 is a block structure with a strip shape. The thickness of the retaining block 254 (that is, the thickness of the retaining block 254 in the axial direction of the annular body 20a) is the same as the width of the inserting slot 251a on the connection end plate 251 (that is, the width of the inserting slot 251a along the axial direction of the annular body 20a), in order to insert the retaining block 254 in the mounting opening formed between the connection end plate 251 and the connection end plate 252. In addition, for facilitating the operation, a holding opening 254a for an operator to perform a holding operation is further provided at one end of the retaining block 254.

The first fastener 253 may be, for example, a bolt and a nut. The retaining block 254 is clamped and fixed between the connection end plate 251 and the connection end plate 252 by the bolt passing through the through holes provided in the connection end plate 251 and the connection end plate 252 and lockingly cooperating with the nut, so that the separate member 21 and the separate member 23 are spaced apart by a predetermined distance T2 (as shown in FIG. 10). Of course, during the process of moving away from each other between the separate member 21 and the separate member 23, the separate member 21 and the separate member 23 are respectively rotated relative to the separate member 22 by the respective corresponding rotation adjusting members 24, thus, an angle α is formed between the connection end plate 251 and the connection end plate 252, and the angle between the two sides of the retaining block 254 in the width direction is preferably configured as an angle α, so that the connection end plate 251 and the connection end plate 252 can be respectively attached to the two sides of the retaining block 254 in the width direction, so the predetermined distance T2 is a radian value (that, the radian between the two sides of the retaining block 254 in the width direction). At this time, the inner diameter of the annular body 20a enclosed by the separate member 21, the separate member 22, and the separate member 23 is larger than the outer diameter of the yoke 11 of the rotor 10, and a predetermined gap is retained between the annular body 20a and the outer diameter of the yoke 11. The predetermined distance T2 is determined based on the predetermined gap to be retained between the annular body 20a and the outer diameter of the yoke 11. For example, the predetermined gap may have a range, for example, from 5 mm to 20 mm, so that the annular body 20a can be sleeved on the outside of the yoke 11.

When the annular body 20a is sleeved on the outer circumferential surface of the yoke 11, the first fastener 253 can be loosened first, that is, the clamping action of the connection end plate 251 and the connection end plate 252 on the retaining block 254 can be released, thereby the retaining block 254 can be removed from between the connection end plate 251 and the connection end plate 252. The connection end plate 251 and the connection end plate 252 can then be fixed to each other by a connection member (when the length of the first fastener 253 does not interfere with the position of the separate member 21 and the separate member 23, the first fastener 253 can also be used as a connector). By the connection end plate 251 and the connection end plate 252 being close to each other, the inner surface of the annular body 20a can be finally attached to the outer circumferential surface of the yoke 11, and at this time, it is preferable to retain the separation member 21 and the separate member 23 at a predetermined distance T1 (as shown in FIG. 9). Thus, the annular body 20a can be closely attached to the outer circumferential surface of the yoke 11 by a manner of leaving a margin, so that the structural strength of the rotor 10 can be effectively enhanced by the reinforcement ring tooling 20. The predetermined distance T1 maybe has a range from, for example, 2 mm to 5 mm. When the annular body 20a is required to remove from the yoke 11, the predetermined distance T2 between the separate member 21 and the separate member 23 can be formed by the retaining block 254 again, thereby removing the reinforcement ring tooling 20 from the rotor 10.

In this way, the reinforcement ring tooling 20 can be quickly mounted on the outer circumference of the rotor 10 or detached from the outer circumference of the rotor 10. In the actual operation process, the reinforcement ring tooling 20 can be selectively mounted in the rotor 10 according to the actual requirement in any part of processing, transporting and assembling the electric machinery, so as to enhance the structural strength of the rotor 10 by the reinforcement ring tooling 20 in a necessary process. When the structural strength of the rotor 10 is not required to be enhanced by the reinforcement ring tooling 20, the reinforcement ring tooling 20 can be detached from the rotor 10 in time, thereby reducing the radial occupation space and operation process of the rotor 10 or the electric machinery in the corresponding part, simplifying the manufacturing process of the electric machinery, saving material and reducing manufacturing costs.

In addition, in the process of mounting the stator and the rotor 10, the structural strength of the rotor 10 can be ensured by the reinforcement ring tooling 20. Therefore, the stator and the rotor 10 can be prevented from being attracted together, thereby improving the mounting reliability of the electric machinery assembly operation, preventing the rotor 10 from being attracted to the stator and further causing structural damage, improving work efficiency, ensuring smooth assembly of the electric machinery, and ensuring personal safety of the operator.

Of course, in other alternative embodiments, the adjusting member may include only the first fastener 253, that is, the first fastener 253 is connected to the connection end plate 251 and the connection end plate 252, so that the connection end plate 251 and the connection end plate 252 are close to each other to retain the predetermined distance T1; or the connection end plates 251 and the connection end plates 252 are spaced apart from each other to retain the predetermined distance T2. In addition, in other alternative embodiments, the adjusting member may be another clamping member capable of clamping the connection end plate 251 and the connection end plate 252, respectively, and capable of providing a locking function for the connection end plate 251 and the connection end plate 252, respectively.

Further, in the above embodiment, the distance adjusting member 25 includes the connection end plate 251, the connection end plate 252, and the adjusting member, but the embodiment of the present application is not limited thereto. In other modified embodiments, the distance adjusting member 25 may be other structures capable of adjusting the distance between the separate member 21 and the separate member 23. For example, the distance adjusting member 25 may include a guiding rail and a slider. One of the connection end plate 251 and the connection end plate 252 is provided with a guiding rail, and the other one of the connection end plate 251 and the connection end plate 252 is provided with a slider that cooperates with the guide rail and is movable along the guiding rail. The purpose of adjusting the distance between the separate member 21 and the separate member 23 can be achieved by the slider moving along the guiding rail.

In the above embodiment, the separate member 21 and the separate member 22 are rotatably connected by the rotation adjusting member 24, the separate member 23 and the separate member 22 are rotatably connected by the rotation adjusting member 24, and the separate member 21 and the separate member 22 may be connected to each other close to each other or away from each other by the distance adjusting member 25, thereby achieving the purpose of detachably mounting the annular body 20a on the outer circumference of the yoke 11. However, in other modified embodiments of the present application, the separate member 21, the separate member 22 and the separate member 23 can be connected to each other by the rotation adjusting member 24 or by the distance adjusting member 25, at the same time achieving the purpose of detachably mounting the annular body 20a on the outer circumference of the yoke 11.

In addition, in the above embodiment, the reinforcement ring tooling 20 includes three separate members, but the embodiment of the present application is not limited thereto, and in other alternative embodiments, the reinforcement ring tooling 20 may include two separate members or more than four separate members. It can be understood that when the reinforcement ring tooling 20 includes two separate members, the two separate members are required to be connected to each other by the two connection members to form the annular body 20a, and at this time, the two connection members are all movable connection members, so as to ensure the two separate members to be detachably mounted on the outer circumference of the rotor 10. When the reinforcement ring tooling 20 includes four separate members, the four separate members are required to be connected to each other by the four connection members to form the annular body 20a, and at least two of the four connection members are movable connection members, so as to ensure the four separate members to be detachably mounted on the outer circumference of the rotor 10.

In addition, at least two of the more than two connection members that are movable connection members may include the rotation adjusting member 24 and/or the distance adjusting member 25, that is, the at least two connection members that are movable connection members may both be the rotation adjusting members 24; or the distance adjusting members 25; one part may be the rotation adjusting member 24, and the other part may be the distance adjusting member 25.

Figure 11:
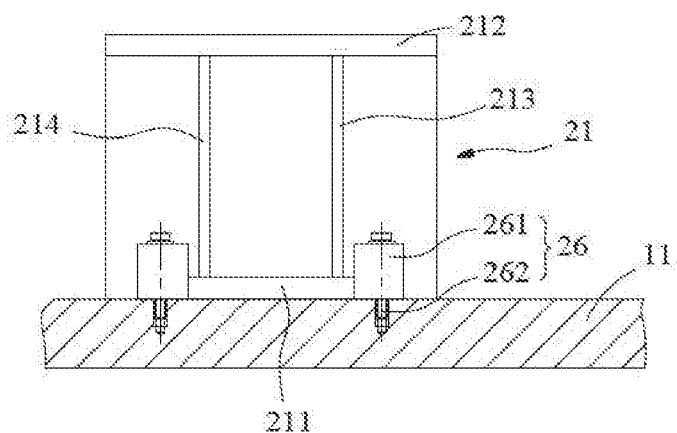
FIG. 11 is an enlarged partial view showing the reinforcement ring tooling in the using state in FIG. 2.

FIG. 11 is an enlarged partial view showing the reinforcement ring tooling 20 in the using state in FIG. 2. As shown in FIGS. 2 and 11, in order to axially limit the annular body 20a on the outer circumference of the yoke 11, the reinforcement ring tooling 20 further includes a limiting member 26. The limiting member 26 is provided on the outer circumferential surface of the yoke 11 and extends outward in the radial direction of the rotor 10 to form a stopper structure, which can limit the annular body 20a moving in the axial direction of the rotor 10.

Specifically, in order to better limit the annular body 20a, the reinforcement ring tooling 20 includes two sets of limiting members 26, and the two sets of limiting members 26 respectively limit the annular body 20a from both axial sides. For example, each set of limiting members 26 includes more than two stoppers 261 and third fasteners 262, and the number of the third fasteners 262 is corresponding to the number of more than two stoppers 261, and the third fasteners 262 can be, for example, bolts. In the present embodiment, the third fasteners 262 include two bolts. The stopper 261 is provided with two through holes through which the bolts can pass, and the outer circumferential surface of the yoke 11 is correspondingly provided with screw connection holes. Thereby, the more than two stoppers 261 of each of the limiting members 26 are respectively fixed to the outer circumference of the yoke 11 by the corresponding third fasteners 262, and extend outward in the radial direction of the yoke 11. Preferably, the more than two stoppers 261 are arranged at equal distances in the circumferential direction of the yoke 11, so that a stable annular structure can be substantially enclosed on the outer circumferential surface of the yoke 11 by the more than two stoppers 261.

When the two sets of the limiting members 26 are respectively mounted to the outer circumferential surface of the yoke 11, the two sets of the limiting members 26 retain a predetermined distance in the axial direction of the yoke 11, so that the annular body 20a can be mounted between the two sets of the limiting members 26, the axially opposite end surfaces of the first curved plate body of each of the separate member 21, the separate member 22 and the separate member 23 are respectively in contact with and abutting engaged with the two sets of the limiting members 26. Thereby, the two sets of the limiting members 26 can provide an axial support force to the annular body 20a, and the attaching force between the annular body 20a and the yoke 11 can be prevented from being insufficient, which may otherwise cause a slip phenomenon, thus the use reliability of the reinforcement ring tooling 20 can be improved, and the reinforcement ring tooling 20 can stably attach to the rotor 10 at all times, and the structural strength of the rotor 10 can be improved.

In addition, in other modified embodiments, the more than two stoppers 261 of each set of limiting members 26 may be replaced with stopping rings. Correspondingly, the reinforcement ring tooling 20 further includes a second fastener, for example, the second fastener may also be a bolt, so that the stopping rings can be fixed to the outer circumferential surface of the yoke 11 by bolts, and at this time, the stopping rings are continuously arranged along the outer circumference of the yoke 11, which can also provide an axial limiting to the annular body 20a through the stopping ring. Of course, the structure of the limiting member 26 is not limited in the embodiment of the present application. In other embodiments, the annular body 20a may be axially limited by other structures that can provide an axial stopping action.

Figure 12:
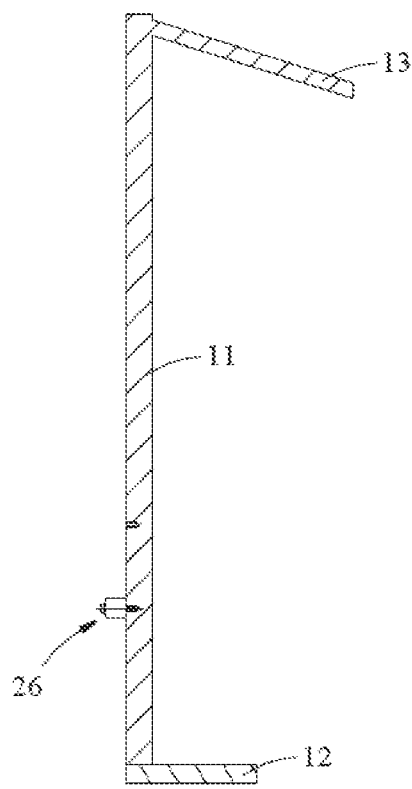
FIG. 12 is a schematic view showing the structure of a reinforcement ring tooling in a first mounting state according to an embodiment of the present application.
Figure 13:
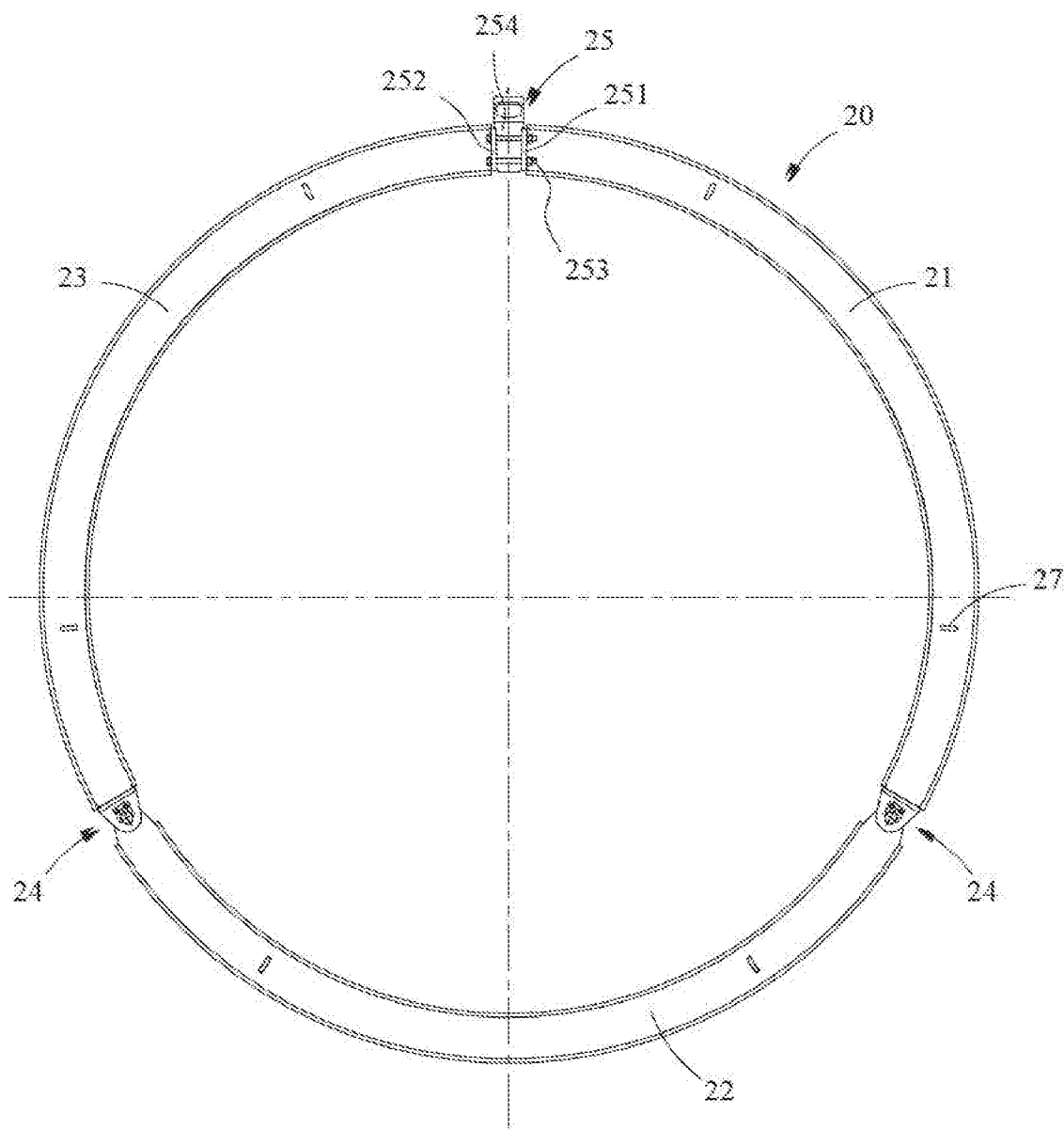
FIG. 13 is a schematic view showing the structure of a reinforcement ring tooling in a second mounting state according to an embodiment of the present application.
Figure 14:
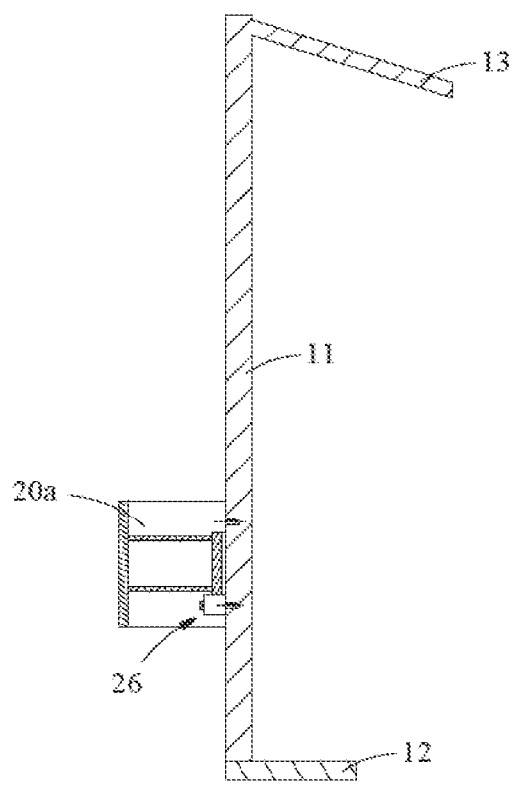
FIG. 14 is a schematic view showing the structure of a reinforcement ring tooling in a third mounting state according to an embodiment of the present application.
Figure 15:
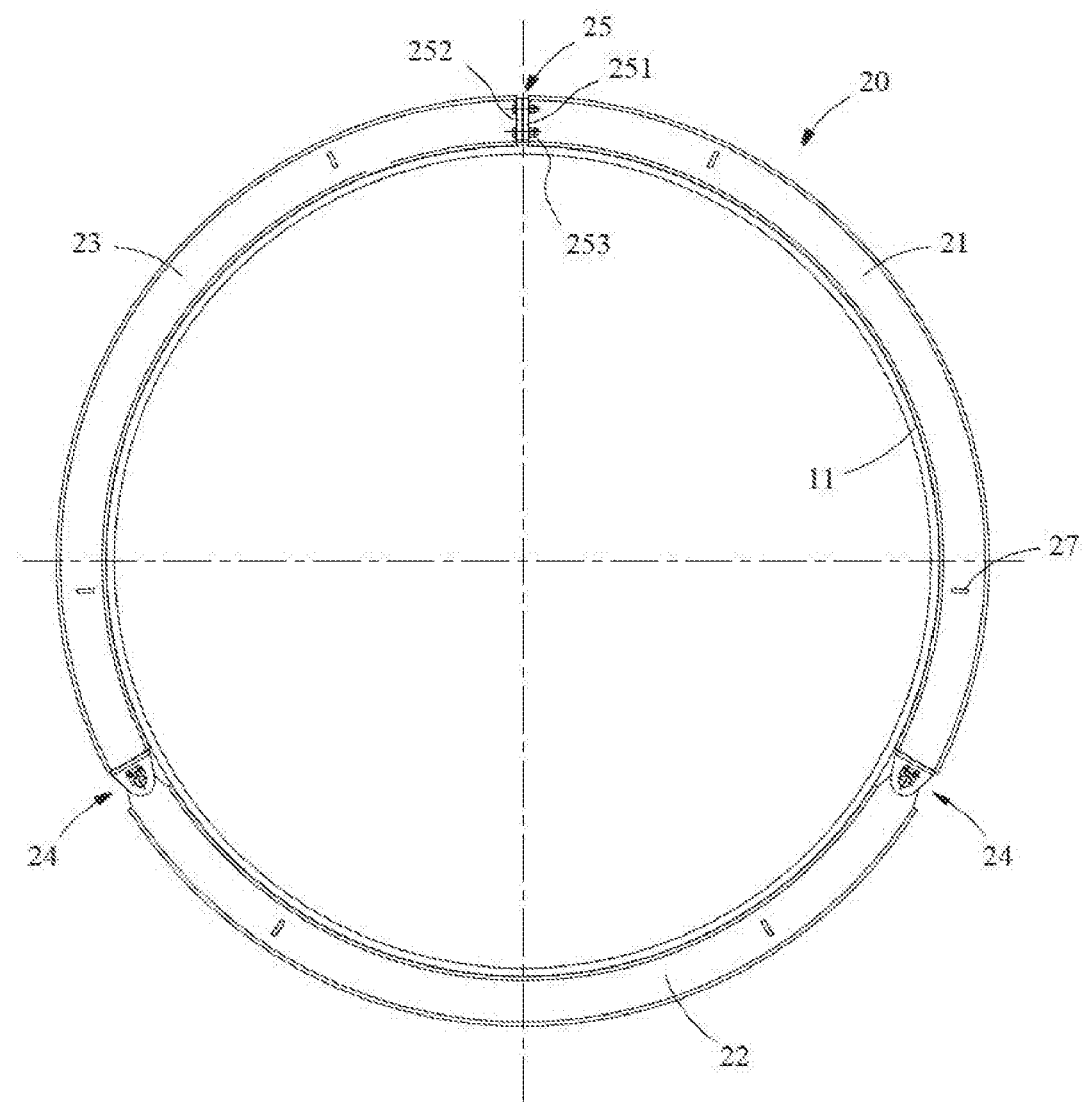
FIG. 15 is a schematic view showing the structure of a reinforcement ring tooling in a fourth mounting state according to an embodiment of the present application.
Figure 16:
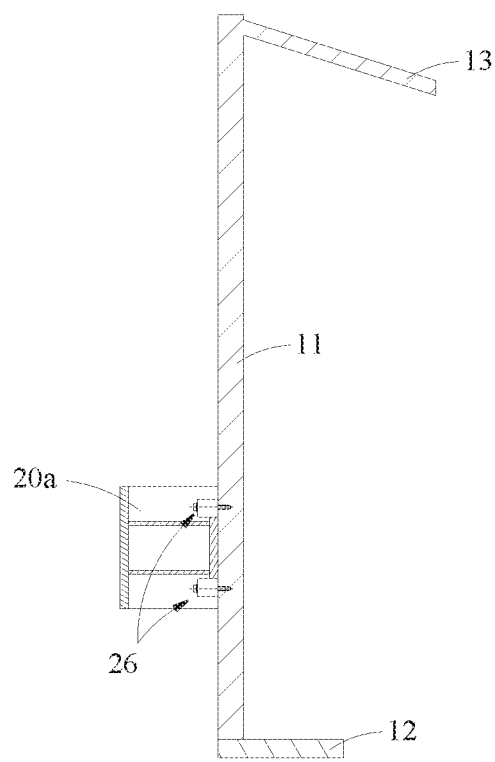
FIG. 16 is a schematic view showing the structure of a reinforcement ring tooling in a fifth mounting state according to an embodiment of the present application.

FIG. 12 is a schematic view showing the structure of a reinforcement ring tooling 20 in a first mounting state according to an embodiment of the present application; FIG. 13 is a schematic view showing the structure of a reinforcement ring tooling 20 in a second mounting state according to the embodiment of the present application; FIG. 14 is a schematic view showing the structure of a reinforcement ring tooling 20 in a third mounting state according to the embodiment of the present application; FIG. 15 is a schematic view showing the structure of a reinforcement ring tooling 20 in a fourth mounting state according to the embodiment of the present application; and FIG. 16 is a schematic view showing the structure of a reinforcement ring tooling 20 in a fifth mounting state according to the embodiment of the present application. According to the embodiment of the present application, a method for mounting the reinforcement ring tooling 20 in the above embodiment is further provided, which includes: a step of providing a separate member, a step of connecting the separate member, and a step of engaging the annular body with the rotor.

The method for mounting the reinforcement ring tooling 20 shown in FIGS. 12 to 16 will be described below.

First, the limiting members 26 are mounted, that is, one set of the two sets of the limiting members 26 is mounted on the outer circumferential surface of the yoke 11, as shown in FIG. 12. Specifically, the axis of the rotor 10 can be placed in a vertical state, and the rotor end cover 12 can be located at the bottom or on the top. In this embodiment, the rotor end cover 12 is located at the bottom. The more than two stoppers 261 are circumferentially fixed to the outer circumferential surface of the yoke 11 by the third fastener 262, and more than two stoppers 261 are located on a side close to the rotor end cover 12, so as to mount the reinforcement ring tooling 20 on the side of the rotor 10 close to the rotor end cover 12, thereby better enhancing the structural strength of the rotor 10.

Secondly, since the three connection members in the reinforcement ring tooling 20 are all movable connection members, and two of the connection members are the rotation adjusting members 24 and the other connection member is the distance adjusting member 25. Therefore, it is necessary to perform the step of providing the separate members first, and then perform the step of connecting the separate members, as shown in FIG. 13.

Specifically, the separate member 21, the separate member 22, and the separate member 23 are provided, the separate member 21 and the separate member 22 are rotatably connected by a set of the rotation adjustment members 24, the separate member 22 and the separate member 23 are rotatably connected by the other set of rotation adjustment members 24. Taking the separate member 21 and the separate member 22 as an example, referring to FIGS. 7 and 13, the separate member 21 and the separate member 22 are placed oppositely so that the pin holes 241c of the lugs 241 mounted on the separate member 21 and the pin holes 242c of the lugs 242 mounted on the separate member 22 are aligned with each other, the pin shaft 244 is inserted into the pin hole 241c of the convex lug 241 and the pin hole 242c of the convex lug 242. Next, one side of the stopping member 245 is inserted into the clamping slot of the pin shaft 244 while abutting against the upper lug plate 241a, and the other side of the stopping member 245 is inserted into the other clamping slot of the pin shaft 244 while abutting against the lower lug plate 241b, and the two stopping member 245 are respectively fixed to the corresponding upper lug plate 241a and lower lug plate 241b by bolts 246, thereby completing the connection of the separate member 21 and the separate member 22, the separate member 23 and the separate member 22 are connected in the same manner.

Next, the corresponding separate members are connected by a predetermined distance via the distance adjusting member 25, that is, the separate member 21 and the separate member 23 are spaced apart by a predetermined distance T2 via the distance adjusting member 25, as shown in FIG. 13. A retaining block 254 is provided between the connection end plate 251 mounted to the separate member 21 and the connection end plate 252 mounted to the separate member 22, that is, the retaining block 254 is inserted into the mounting opening between the separate member 21 and the separate member 23, thereby retaining the predetermined distance T2 between the separate member 21 and the separate member 23. The connection end plate 251 and the connection end plate 252 are fixedly connected by the first fastener 253, so that the retaining block 254 is clamped between the connection end plate 251 and the connection end plate 252. Thereby, the separate member 21, the separate member 22, and the separate member 23 enclose to form the annular body 20a.

Next, through the cooperation of the lifting mechanism and the lifting lug 27 of the reinforcement ring tooling 20, the annular body 20a composed of the separate member 21, the separate member 22 and the separate member 23 is lifted so that the axis thereof is in a vertical state, coincides with the axis of the rotor 10, and is mounted around the outside of the rotor 10 from top to bottom, and finally the respective one end surfaces in the axial direction of the first curved plate bodies of the separate member 21, the separate member 22, and the separate member 23 are simultaneously in contact with the upper surfaces of the more than two stoppers 261 as shown in FIG. 14.

Then, after the annular body 20a is mounted on the outer circumference of the rotor 10, the distance between the respective separate members is retained by a predetermined distance T1 by the distance adjusting member 25, so that the annular body 20a is attached to the outer circumferential surface of the yoke 11, as shown in FIG. 15. Specifically, the first fastener 253 is loosened, the retaining block 254 is pulled out from between the connection end plate 251 and the connection end plate 252, and the connection end plate 251 and the connection end plate 252 are gradually brought closer by the first fastener 253 until the annular body 20a is in close contact with the outer circumferential surface of the yoke 11. In the process of gradually bringing the connection end plate 251 and the connection end plate 252 closer by the first fastener 253, the separate member 21 and the separate member 22 and the separate member 23 and the separate member 22 are respectively rotated relative to each other around the corresponding pin shaft 244 so that a predetermined distance T1 is finally formed between the connection end plate 251 and the connection end plate 252. Finally, the respective first curved plate bodies of the final separate member 21, the separate member 22, and the separate member 23 are closely attached to the outer circumferential surface of the yoke 11.

Finally, the limiting member 26 is then mounted, that is, the other set of the two sets of the limiting members 26 is mounted to the outer circumferential surface of the yoke 11, as shown in FIG. 16. That is, through the cooperation of the third fastener 262 with the screw holes on the outer circumferential surface of the yoke 11, more than two stoppers 261 of the other set of the limiting members 26 are fixed to the outer circumferential surface of the yoke 11, and the set of the limiting members 26 are located on the other axial side of the annular body 20a. At this time, the both end surfaces in the axial direction of the first curved plate bodies of the separate member 21, the separate member 22, and the separate member 23 respectively abut against more than two stoppers 261 located on both axial sides of the annular body 20a. Thereby, the annular body 20a is retained on the outer circumferential surface of the yoke 11, that is, the mounting of the reinforcement ring tooling 20 is completed.

The above steps are the process of mounting the reinforcement ring tooling 20 to the rotor 10, and the reinforcement ring tooling 20 can be detached from the rotor 10 in the order from the back to the front and in a reverse operation of the respective steps.

Of course, the steps in the method for mounting the reinforcement ring tooling 20 according to the above embodiment are not specifically defined. In other modified embodiments, when the three separate members of the reinforcement ring tooling 20 are rotatably connected by the rotation adjusting member 24, since the distance adjustment between the three divided members is impossible, it is required to perform the step of providing the separate member first, and then perform the step of attaching the annular body with the rotor, that is, it is required to retain the three separate members on the outer circumference of the rotor 10 and respectively attached to the outer circumferential circumferential surface of the yoke 11 to form the annular body 20a, and then the three separate members can then be connected two by two by means of three connection members, that is, the three rotation adjusting members 24, thereby completing the final step of connecting the separate members.

According to another embodiment of the present application, a rotor 10 is provided, which includes: a yoke 11, a magnetic pole provided on an inner circumference of the yoke 11, and a reinforcement ring tooling 20 according to any one of the above embodiments, which is mounted on the outer circumference of the yoke 11. Since the rotor 10 according to the present embodiment includes the reinforcement ring tooling 20 of the above embodiment, the rotor 10 has the same advantages as the reinforcement ring tooling 20, which will not be described again.

According to yet another embodiment of the present application, an electric machinery is provided, which includes: a stator and the rotor 10 of the above embodiment, the rotor 10 is sleeved on the outside of the stator. Since the electric machinery in this embodiment includes the reinforcement ring tooling 20 of the above embodiment, the electric machinery has the same advantages as the reinforcement ring tooling 20, which will not be described again.

The application can be embodied in other specific forms without departing from the spirit and essential characteristics. The present embodiments are to be considered in all respects as illustrative and not restrict. The scope of the present application is defined by the appended claims rather than the above description, and all changes that come within the scope of the claims and the equivalents thereof are included in the scope of the present application. Moreover, different technical features that appear in different embodiments can be combined to achieve a beneficial effect. Based on the drawings, the specification and the claims, those skilled in the art can understand and implement other variations of the disclosed embodiments.

The invention claimed is:

1. A reinforcement ring tooling mounted on an outer circumference of a rotor of an electric machinery, comprising more than two separate members and more than two connection members,
wherein the more than two connection members are in correspondence with the more than two separate members, and the more than two separate members are connected to each other to form an annular body through the more than two connection members,
wherein at least two of the more than two connection members are movable connection members, and the corresponding separate members are movably connected to each other by the movable connection members, which allows the reinforcement ring tooling to detachably attach to the outer circumference of the rotor.

2. The reinforcement ring tooling according to claim 1, wherein the movable connection members comprise:
a rotation adjusting member, wherein the corresponding separate members are connected in a manner that the corresponding separate members are rotatable relative to each other through the rotation adjustment member; and/or
a distance adjusting members, wherein the corresponding separate members are connected in a manner that the corresponding separate members are allowed to be close to or away from each other through the distance adjusting members.

3. The reinforcement ring tooling according to claim 2, wherein the movable connection members comprise the rotation adjusting member, the rotation adjusting member comprises a pin shaft and pin holes respectively provided at the corresponding separate members, and the corresponding separate members are rotatably connected through the pin shaft passing through the pin holes.

4. The reinforcement ring tooling according to claim 3, wherein the corresponding separate members are respectively provided with a convex lug, and the pin holes are provided on the convex lug.

5. The reinforcement ring tooling according to claim 4, wherein the rotation adjusting member further comprises a locking member that engages to the pin shaft for limiting an axial movement of the pin shaft in the pin holes.

6. The reinforcement ring tooling according to claim 5, wherein the locking member comprises a stopping member, the pin shaft is provided with a clamping slot corresponding to the stopping member along an outer circumferential surface, and the clamping slot is located outside the convex lug, which allows the stopping member to be inserted into the clamping slot while simultaneously abutting the convex lug.

7. The reinforcement ring tooling according to claim 4, wherein the convex lug comprises an upper convex lug plate and a lower convex lug plate, the pin holes are respectively provided in the upper convex lug plate and the lower convex lug plate, and a retaining sleeve is further provided in at least one of the pin holes of the convex lug for contacting and cooperating with the pin shaft through the retaining sleeve.

8. A reinforcement ring tooling according to claim 2, wherein the movable connection members comprise the distance adjusting member, the distance adjusting member comprises two connection end plates and an adjusting member, the two connection end plates are respectively provided at connection ends, opposite to each other, of the corresponding separate members, the adjusting member is respectively connected with the two connection end plates for adjusting the distance between the two connection end plates.

9. The reinforcement ring tooling according to claim 8, wherein the adjusting member comprises a retaining block and a first fastener, the retaining block is detachably mounted between the two connection end plates, and clamped between the two connection end plates by the first fastener passing through the two connection end plates.

10. The reinforcement ring tooling according to claim 9, wherein one side of each of the two connection end plates is provided with an inserting slot, each of the two connection end plates is provided with the inserting slot having a surface, two surfaces of the two connection end plates are opposed to each other and cooperate with each other to form a mounting opening, and the mounting opening extends in a radial direction of the annular body; and a thickness of the retaining block is the same as a width of the inserting slot on each of the connection end plates, which makes the retaining block to be inserted in the mounting opening.

11. A reinforcement ring tooling according to claim 2, wherein the movable connection members comprises the distance adjusting member, the distance adjusting member comprises two connection end plates, a guiding rail and a slider, the two connection end plates are respectively provided at the connection ends, opposite to each other, of the corresponding separate members, one of the two connection end plates is provided with the guiding rail, and the other connection end plate is provided with the slider that cooperates with the guiding rail and is movable along the guiding rail.

12. The reinforcement ring tooling according to claim 1, further comprising a limiting member, wherein the limiting member is provided on an outer circumferential surface of the rotor and extends outward in a radial direction of the rotor to cooperate with the annular body and limit the annular body to move in the axial direction of the rotor.

13. The reinforcement ring tooling according to claim 12, comprising two sets of the limiting members, wherein the two sets of the limiting members are respectively located at two sides in an axial direction of the annular body.

14. The reinforcement ring tooling (20) according to claim 12, wherein the limiting member (26) comprises more than two stoppers (261) and a third fastener (262) corresponding to the more than two stoppers (261), the more than two stoppers (261) are arranged apart from each other on the outer circumference of the rotor (10) in the circumferential direction through the corresponding third fasteners (262), respectively.

15. The reinforcement ring tooling according to claim 1, wherein the separate members comprises a first curved plate body, a second curved plate body and a supporting member connected between the first curved plate body and the second curved plate body, the first curved plate body and the second curved plate body are retained at a predetermined distance from each other by the supporting member, and the more than two separate members enclose to form an accommodation space by the respective first curved plate body.

16. A rotor, comprising a yoke and a magnetic pole provided on an inner circumference of the yoke, wherein the rotor further comprises a reinforcement ring tooling according to claim 1, which is mounted to an outer circumference of the yoke.

17. An electric machinery, comprising the rotor according to claim 16.

18. A method for mounting a reinforcement ring tooling, comprising: a step of providing separate members: providing more than two separate members and more than two connection members corresponding to the more than two separate members; a step of connecting the separate members: connecting the more than two separate members to each other by the more than two connection members to form an annular body, wherein at least two of the more than two connection members are configured as movable connection members, which allows the corresponding separate members to be movably connected to each other by the movable connection members; and a step of attaching the annular body to the rotor: mounting the annular body to the outer circumference of the rotor.

19. The method for mounting the reinforcement ring tooling according to claim 18, wherein the movable connection member comprises:

a rotation adjusting member, wherein the corresponding separate members are connected in a manner that the corresponding separate members are rotatable relative to each other through the rotation adjustment member; and a distance adjusting members, wherein the corresponding separate members are connected in a manner that the corresponding separate members are allowable to be close to or away from each other through the distance adjusting members.

20. The method for mounting the reinforcement ring tooling according to claim 19, wherein the step of connecting the separate members further comprises: connecting the corresponding separate members by a predetermined distance through the distance adjusting member; and the step of attaching the annular body to the rotor further comprises: mounting the annular body to the outer circumference of the rotor and attaching the corresponding separate members to each other by the distance adjusting member, which makes the outer circumferential surface of the annular body attach to the outer circumferential surface of the rotor.

* * * * *